United States Patent [19]

Glowaky et al.

[11] 4,061,610

[45] Dec. 6, 1977

[54] COATING COMPOSITIONS CONTAINING STARCH HALF-ESTERS AND PROCESS FOR PREPARING SAME

[75] Inventors: Raymond Charles Glowaky, Matteson; Stephen Edward Rudolph, Glenwood; Gordon Paul Bierwagen, Homewood, all of Ill.

[73] Assignee: The Sherwin-Williams Company, Cleveland, Ohio

[21] Appl. No.: 687,587

[22] Filed: May 19, 1976

[51] Int. Cl.$^2$ .............................................. C08L 3/06
[52] U.S. Cl. ........................... 260/17.4 ST; 536/108; 536/110
[58] Field of Search ................. 260/17.4 ST; 536/110

[56] References Cited

U.S. PATENT DOCUMENTS

| | | | |
|---|---|---|---|
| 2,589,226 | 3/1952 | Carson | 536/110 |
| 2,661,349 | 12/1953 | Caldwell et al. | 536/110 |
| 2,891,947 | 6/1959 | Paschall et al. | 536/110 |
| 3,732,207 | 5/1973 | Kovats | 536/110 |
| 3,839,320 | 10/1974 | Bauer | 536/106 |
| 4,011,392 | 3/1977 | Rudolph | 536/108 |

*Primary Examiner*—Edward M. Woodberry

*Attorney, Agent, or Firm*—James V. Tura; Richard G. Smith; Neil A. DuChez

[57] ABSTRACT

This invention is directed to aqueous compositions and to the process for preparing same which comprises a dispersion of polymeric resin binders and pigments in an aqueous system with a dispersant. The dispersant consists of half-esters of starch derived from (a) low molecular weight hydrolyzed starch having a plurality of anhydroglucose units or a derivative of said starch and (b) at least about 0.25 mole of at least one cyclic anhydride of a polycarboxylic acid for each anhydroglucose unit of the hydrolyzed starch and/or its derivatives.

These half-ester starch dispersants are characterized as having pendant carboxyl groups and average molecular weights ranging up to about 100,000 with a high degree of substitution, i.e. wherein on an average of about 0.25 to 3.0 of the hydroxyl groups of each anhydroglucose unit are esterified. The unreacted carboxyl groups pendant from the backbone of the starch esters may be further reacted, i.e. neutralized with various reagents including, for example, metal compounds such as the alkali and alkaline earth metal hydroxides, amines, ammonia, alcohols, etc. to various degrees depending upon the hydrophilic/hydrophobic character desired of the products.

25 Claims, No Drawings

COATING COMPOSITIONS CONTAINING STARCH HALF-ESTERS AND PROCESS FOR PREPARING SAME

BACKGROUND

This invention relates to aqueous compositions, e.g. coatings such as latex paints and to the process of preparing aqueous dispersions of pigment and a polymeric resin in an aqueous medium with a dispersing agent consisting of half-esters of starch characterized as having pendant carboxyl groups and an average degree of substitution ranging from 0.25 to 3.0 wherein at least 10 mole percent of said pendant carboxyl acid groups are neutralized. These half-esters of starch or dispersants are derived from low molecular weight hyrolyzed starch molecules having a plurality of anhydroglucose units and acylating agents consisting of at least one cyclic anhydride of polycarboxylic acids.

The incentive for developing dispersants derived from starches is the uncertainty over the availability of similar materials derived from petrochemicals. A way to avoid the problems encountered because of shortages of compounds prepared from petrochemicals is to diversify the raw materials from which these compounds are derived by relying on agricultural products. These products are renewed on an annual basis and the volume, if necessary, can be expanded in accordance with the demands by increasing the acreage. For example, starch which is derived from corn, potatoes and the like is presently being produced at rates exceeding 10 billion pounds per year and is being used for a variety of industrial applications in its natural form. However, starch in most instances must be chemically modified, e.g. esterified, etc. before products are obtained with the required characteristics and particularly for use in aqueous systems. Presently, low molecular weight starches with high degrees of substitution are not commercially available and for the most part only the very high molecular weight starches with low degrees of substitution are being used in most commercial applications.

The standard grade of high molecular weight starches consist of approximately 80% amylopectin with average molecular weights ranging from 1 to 30 million and about 20 percent of amylose with average molecular weights ranging from about 40,000 to 300,000. The structure of amylopectin and amylose may be illustrated by Formulas I and II wherein $n$ is the number of linear and branched anhydrolgucose repeating units.

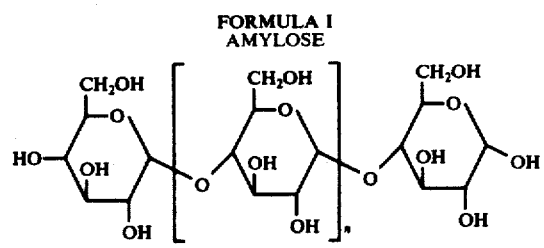

FORMULA I
AMYLOSE

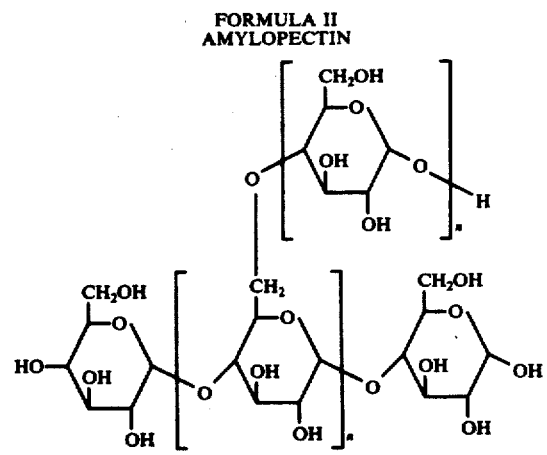

FORMULA II
AMYLOPECTIN

In comparison to these starches which comprise high molecular weight polymeric chains of amylose and amylopectin, the hydrolyzed starches of this invention used in preparing the dispersants comprise depolymerized chains of amylose and amylopectin with average molecular weights ranging only up to about 100,000 and more likely ranging up to about 80,000, e.g. from about 400 to 80,000. The comparatively low molecular weight starches are obtained from the high molecular weight materials by known techniques. These starches are specifically illustrated in Table I wherein the average molecular weight was determined by gel permeation chromatography with polydextran standards and filtered deionized water as the carrier solvent. In addition to the materials recited in the Table, there are numerous other low molecular weight starches and various derivatives thereof with low degrees of substitution which can be used for purposes of this invention.

TABLE I

| Starch Materials | Type | D.E. | Supplier | Approx. Average Molecular Weight |
|---|---|---|---|---|
| Fro-Dex 42 | Dried corn syrup | 12 | American Maize-Products Co. | 600 |
| Fro-Dex 15 | Maltodextrin | 18 | American Maize-Products Co. | 16,000 |
| Amaizo 1736 | Dextrin | 4 | American Maize-Products Co. | 16,000 |
| Mor-Rex 1918 | Cereal Solids | 10 | CPC International | 18,000 |
| Experimental Sample | Low D. E. Hydrolysate | 5 | American Maize-Products Co. | 35,000 |
| RL 5540 | Enzyme Hydrolysate | 0 | SW Laboratories | 86,000 |

While much attention has been given to the higher molecular weight starches, comparatively little has been done with the low molecular weight materials especially the low molecular weight starches with high degrees of substitution. There are many advantages in using lower molecular weight starches and particularly important is the ability to control solubility which provides a means of preparing highly concentrated solutions of workable viscosity.

The hydrolyzed, low molecular weight starches may be characterized as comprising branched and linear anhydroglucose units, but more likely consist essentially of linear or straight polymeric chains since many of the branched points were cleaved during hydrolysis.

It has been found that the low molecular weight starches which have been highly substituted by esterification can be used effectively as dispersants in aqueous systems and particularly in aqueous coating systems. The properties of the hydrolyzed starch molecules can be varied or controlled largely by the extent and type of acylating agent, i.e. by the cyclic anhydrides. Starch, for example, is substantially a polymer of glucose having three hydroxyl groups for each repeating unit (see the structure of amylose and amylopectin) and by converting all or substantially all of the hydroxyl groups of each anhydroglucose unit to ester groups, the esterified starch may then be characterized as having a degree of substitution or D. S. value of 3.0. This is the maximum degree of substitution but lower degrees of substitution can be obtained by controlling the relative amounts of the reactants, i.e. the hydrolyzed starch and the anhydride in esterification. For purposes of this invention, the degree of substitution is essential and, therefore, must fall within the range of about 0.25 up to 3.0 and preferably should be greater than 0.5. The D.S. value is therefore a means of characterizing the number of substituents, e.g. ester groups per anhydroglucose unit.

It is obvious that various other derivatives of the low molecular weight hydrolyzed starches characterized as having low degrees of substitution, i.e. below about 0.1 can be used also either alone or in combination in any proportion with the unsubstituted hydrolyzed starches in preparing the esterified products.

Accordingly, it is an object of this invention to provide comparatively low molecular weight half-esters of starch as dispersants for latex coating compositions. It is another object of this invention to provide esterified low molecular weight half-esters of starch having a high degree of substitution as dispersants for pigments in aqueous systems. It is another object of this invention to provide low molecular weight anionic half-esters of starch having high D. S. values and pendant carboxyl groups with various hydrophilic/hydrophobic characteristics as dispersants in latex coatings. It is further an object of this invention to provide an aqueous coating composition comprising half-esters of starch as a dispersant to improve the hiding efficiency of the pigment.

DETAILED DESCRIPTION

This invention relates to coating compositions generally referred to as latex paints, which comprises aqueous dispersions of from about 25 to 95 or 50 to 80 parts by volume of a polymeric resin binder, 5 to 75 or 20 to 50 parts by volume of pigment, e.g. $TiO_2$ and a dispersing amount, i.e. ranging up to 25% and as low as 0.05%, e.g. 1.0 to 10% by weight of the pigment of the dispersant. The dispersant consists of half-esters of starch characterized as having pendant carboxylic acid groups with an average degree of substitution ranging from about 0.25 to 3.0 and wherein at least about 10 mole percent and more likely 50 mole percent of the pendant carboxylic acid groups are neutralized, e.g. from 10 to 100 mole percent neutralized with an inorganic metal compound, or the like. The half-esters of starch are derived from (a) low molecular weight hydrolyzed starch having a plurality of anhydroglucose units and an average molecular weight ranging up to about 100,000 or a derivative of said hydrolyzed starch wherein the derivative is characterized as having a low degree of substitution, i.e. below about 0.1 and (b) at least about 0.25 mole of at least one cyclic anhydride of a polycarboxylic acid for each anhydroglucose unit of the hydrolyzed starch or of said hydrolyzed starch derivative.

Preferably, the dispersants have average molecular weights below 100,000, e.g. ranging from about 2000 to 80,000 with an average degree of substitution greater than about 0.25 and preferably greater than 0.5, e.g. ranging from about 1.0 to 2.5.

These starch dispersants may be used in a variety of aqueous systems but are particularly useful in aqueous coatings such as latex paints. The term "latex paints or coatings" as used herein means aqueous dispersions of generally water-insoluble organic, film-forming polymeric resins. It is generally known, that latex paints usually contain various components such as pigments, binders, emulsifying agents or surfactants, pH control agents and are referred to as emulsion paints, water-based paints, water dilutable paints, etc. The film-forming or polymeric resin binder is present in the form of very fine particles and as the paint dries, the particles coalesce forming a film. Thus, the novel coating compositions of this invention comprise aqueous dispersions of water-insoluble polymeric resins or binders, e.g. acrylic resins with pigments and dispersing amounts based on the dry weight of the pigment, of a dispersant consisting of the starch half-esters of this invention. The amount of pigment in aqueous coatings may range from about 5 to 75% by volume of the total amount of non-volatile material (pigment volume concentration) and preferably from about 20 to 50% by volume.

Generally, the latex paint is prepared by dispersing the polymeric resin in the aqueous phase together with other conventional coating ingredients. The polymeric resins dispersed in the aqueous medium consist of resinous particles with average particle sizes ranging between 0.01 microns up to about 3.0 microns and preferably between 0.1 and 1.0 microns. The continuous phase of the dispersion comprises water as the suspending medium which also may contain various amounts of organic solvent. These solvents are useful to adjust the viscosity, control the evaporation characteristics of the coating, provide stability, etc. In addition, the coatings may contain various surface active agents which help to stabilize the polymeric and pigment particles. The solvents include all the water soluble or water miscible organic liquids generally used in latex paints and are usually present in amounts ranging up to 40% of the aqueous dispersion. These liquids include the various mono and polyhydric alcohols, such as the alkylene glycols, the glycol ethers, the ether alcohols, the ketones, and particularly the lower alcohols and glycols such as ethyl alcohol, propyl alcohol, ethylene glycol, propylene glycol, butylene glycol, etc.

Pigments which can be dispersed in the aqueous systems generally include titanium dioxide, zinc oxide, antimony oxide, zinc sulfide, zirconium oxide, white lead, the silicates, carbon black, lithopone, iron oxide, lead chromate, the molybdates, e.g. molybdate orange, and various organic pigments such as phthalocyanine blue, phthalocyanine green, etc. In addition, various pigment extenders may be used and include calcium carbonate, talc, silicates, diatomaceous earth, china clay, silica, mica and the like.

The composition of the resin binder is not particularly critical and various polymers and copolymers may be used. Of particular interest are the acrylic copolymers including the esters of acrylic and methacrylic acid wherein the ester groups contain up to 18 carbon atoms. These copolymers include acrylic monomers copolymerized with various olefins such as styrene, butadiene, etc. In addition to the acrylic polymers, various mixtures of the acrylices with Buna-S are useful for interior coatings. In general, the polymeric resin binders useful in preparing the aqueous dispersions are well known in the art and as such are not critical to the overall success of the coating. Therefore, various polymeric binders may be used in the prescribed proportions with various pigments and the dispersant in accordance with this invention. In addition to the dispersion of the pigment and polymeric resin in the aqueous system, other ingredients generally known in the art which can be used include various additives or modifiers such as sequestering agents, bactericides and various other particulate water-insoluble organic film-forming materials.

These coatings may be applied by conventional methods to different substrates, e.g. house sidings and other weather-exposed articles by known methods such as brushing, spraying, roller coating and the like. The substrates may include wood, various metals such as aluminum, composition, brick, stucco, etc.

In comparison to other esterified starches, the low molecular weight starches of this invention are regarded as having a high degree of substitution in starch technology. The low degree of substitution materials are more common, in that the D. S. values range anywhere from 0.0001 up to 0.05. These materials, however, are not particularly different from the unmodified starches and, therefore, they must be chemically modified to adjust the hydrophilic/hydrophobic characteristics. Generally, the hydrophobicity of the starch increases as the degree of substitution increases as indicated by the solubility characteristics of the modified starches which changes from a water-soluble, organic-insoluble at low degrees of substitution to water-insoluble, organic-soluble at high degrees of substitution. For example, the starch half-esters having the necessary degree of substitution are esters which are insoluble in water, but soluble in organic solvents or basic aqueous media.

The basic starch material, utilized in preparing the half-esters may be derived from various vegetable sources such as corn, wheat, rice, potatoes, grain, tapioca, etc. These starches are predominantly and in some instances exclusively amylose or amylopectin or a mixture of these two types of molecules in various proportions. The high molecular weight starches may be converted to a lower molecular weight, for purposes of this invention, by various known processes, e.g. by exposing the starch molecule to acid, enzymes, heat, etc. under conditions of various concentrations, solvent, temperatures, pressures, etc. As indicated, the low molecular weight starches that have been derivatized before or after the hydrolysis may be used either alone or in combination with the unmodified starches so long as the degree of substitution is below 0.1. These starch derivatives include, for example, the starch ethers, carbamates, esters, etc. The preferred materials include the low molecular weight hydrolyzed starches and its derivatives characterized as having a dextrose equivalent value ranging up to about 40 and more likely up to 30 as measured by the Luc-Schoorl method.

The starch hydrolysates consist essentially of either linear or branched chains or in the alternative may have a distribution of species ranging from linear, i.e. the straight chain or prevailing linear to the highly rearranged or branched chains. Specifically, these materials include the enzyme-modified starches, the acid hydrolysates, the low D. E. hydrolysates, the dextrins and various derivatives or modified hydrolysates as indicated herein and various other low molecular weight starches which are commercially available as cereal solids, maltodextrins, dried syrups, thin boiling starches, amylose fractions, etc. Any one or all of these low molecular weight starches and the derivatives thereof may be used and are referred to herein by the term "low molecular weight hydrolyzed starches." The half-esters of starch may be described as containing anionic groups pendant from the backbone of the polymer and include the aliphatic and/or aromatic half-ester groups, i.e. the residues of a cyclic, aliphatic and/or aromatic anhydride. These simple half-esters are derived from cyclic anhydrides such that each esterified group has a pendant carboxyl group which may be further reacted, i.e. neutralized to adjust the hydrophilic characteristics of the polymer. These esterified starches are considered essentially polyelectrolytic and may be solubilized in water by the addition of a base, e.g. reacting the pendant carboxyl groups with an alkali metal compound such as the metal hydroxide. As the degree of substitution increases, the starch molecules become highly charged in a neutralized state. Typical examples include starch phthalates, starch succinates and particularly the alkenyl succinates. As illustrated in the following formula, $n$ has a value such that the average molecular weight of the molecule ranges from as low as 400 up to about 100,000.

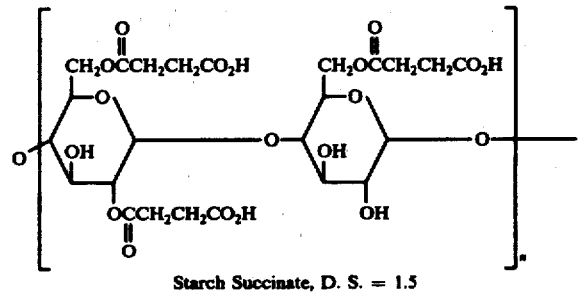

Starch Succinate, D. S. = 1.5

The carboxyl-containing aliphatic, cyclic, aromatic and/or heterocyclic half-esters of starch as distinguished from other esterified starches have characteristics making them unique particularly from the simple esters, i.e. esters derived from a monocarboxylic acid in that here carboxyl groups are available for subsequent reaction with various reactants to form the corresponding salts, amides, esters and the like.

While there are various processes for the esterification of starch, as indicated by the literature, these procedures are unsatisfactory for the instant invention in that the processes involve direct esterification in the presence of water or with an acid as distinguished from anhydrides. In the instant process, there are some constraints which limit the techniques in that the starch molecules are to be highly substituted which, therefore, requires that the reaction be carried out to substantially stoichiometric completion. Thus, esterification techniques generally used to prepare products with low degrees of substitution through formation of a small equilibrium concentration of the esters are not applicable. More specifically, these procedures are not satisfactory in that the presence of water or water-forming reactants, i.e. acids shift the reaction predominantly toward the starting material and, therefore, the highly substituted products cannot be obtained. Moreover, the thermostability of starch is such that decomposition begins at comparatively low temperatures which generally means mild thermo conditions must be employed and, therefore, reactants of low reactivity requiring elevated temperatures cannot be used. The solubility and other characteristics of starch is such that they impose a restriction on the choice of esterification procedures. For examples, starch is soluble in pyridine, formamides and the like, but is substantially insoluble in most organic solvents such as the hydrocarbons. Since it is desirable to have a process which provides good control of the reaction and because it is necessary to provide products with reproducible degrees of substitution, it is essential that the reaction medium contain a comparatively good solvent for the starch or at least a solvent for the product.

For purposes of this invention, the esterification of the hydrolyzed starch must take place in a reaction medium free of water or a medium which is substantially free of water and contains at least one solvent, e.g. pyridine, formamide or the like. A unique feature in utilizing pyridine as distinguished from other solvents is that pyridine functions as a promoter in the formation of an intermediate which subsequently undergoes nucleophilic substitution. Esterification generally occurs readily and goes to a high percent of conversion even though in some instances, some interferring factors and the presence of small amounts of moisture in the starch, e.g. from 2 to 3% water react with the anhydride hydrolyzing it to the corresponding acid which is very slow in reacting with starch under the conditions of this invention. For these reasons, therefore, it is generally a practice to add a sufficient amount of anhydride in excess of the stoichiometric amount, e.g. upwards of 10 to about 20% or more in excess of the stoichiometric amount required in order to consume any small amount of water that may be present in the starch. The carboxyl-containing half-esters of starch having high D. S. values can be obtained from cyclic anhydrides as illustrated by the following example.

EXAMPLE A

| Reactants | Parts by Weight | Moles |
|---|---|---|
| Hydrolyzed Cereal Solids | 200 total of 194.8 Starch & 5.2 Water | 1.20 0.29 |
| Succinic Anhydride | 150.0 | 1.5 |

-continued

| Reactants | Parts by Weight | Moles |
|---|---|---|
| Pyridine | 200.0 | |

In preparing the succinate ester of the starch, the hydrolyzed starch was added to a reaction medium comprising pyridine and the resulting suspension was heated with the stirring to temperatures ranging up to about 82° C until a clear solution was obtained in approximately 30 minutes. The reaction mixture was held at about 82° C and the succinic anhydride was added in small portions over approximately 30 minutes. The reaction mixture was then held at this temperature for additional period of about 4 hours to assure completion of the reaction. The procedure yielded a homogeneous solution of the starch ester in pyridine from which the ester was separated by precipitating the pyridine solution into a non-solvent, e.g. a precipitating system comprising a hydrocarbon such as hexane.

The conversion of the hydrolyzed starch to the corresponding starch ester is substantially quantitative in that there are no major side reactions except for some loss due to impurities, filtrations, drying, handling, etc. Esterification of the glucose repeating unit proceeds in a random or statistical manner wherein each glucose unit is available for reaction with each anhydride group. The degree of substitution can be readily determined by various analytical methods including nuclear magnetic resonance spectra (NMR) of the esters not only to identify the structure, but also to determine the degree of substitution. It is further possible to quantitatively determine the degree of substitution of the esters by hydrolysis of the ester groups. Other methods of determining structure include the determination of the hydroxyl content, the acid values and by the use of infrared data.

Because the solubility of these esters occurs through ionic forces, they are inherently hydrophobic in character but may be used in aqueous systems as dispersing agents provided there is sufficient carboxyl functionality to obtain the necessary solubility. A combination of the bulky organic groups attached to the polyelectrolyte is believed to be responsible for the dispersant properties by being absorbed on the pigment particles, e.g. $TiO_2$, through the carboxyl group thereby resulting in a particle which is considered stabilized.

TABLE II

Effect of Dispersant Level and Neutralizing Base on Hiding of Paints Based on Starch Ester Dispersant

| No. (a) | Dispersant (b) | Conc. % (c) | Neutr. Base | Contrast Ratio | $S_6$ (d) ($m^2/g$ $TiO_2$) | pH | Viscosity (e) |
|---|---|---|---|---|---|---|---|
| 1 | Tamol 731 | 0.50 | — | 96.7 | 0.30 | 8.4 | 90 |
| 2 | RL 4473 | 0.25 | $NH_4OH$ | 96.2 | 0.31 | 9.1 | 143 |
| 3 | " | 0.25 | NaOH | 96.8 | 0.33 | 8.8 | 138 |
| 4 | " | 0.50 | $NH_4OH$ | 96.2 | 0.28 | 9.1 | 93 |
| 5 | " | 0.50 | NaOH | 96.3 | 0.30 | 8.8 | 87 |
| 6 | " | 1.00 | $NH_4OH$ | 95.8 | 0.29 | 8.9 | 75 |
| 7 | " | 1.00 | NaOH | 94.8 | 0.27 | 8.5 | 80 |

(a) Average values obtained on three acrylic latex paints.
(b) Tamol 731, Rohm and Haas. RL 4473, starch n-octenyl succinate (D.S. 1.5) from cereal solids.
(c) Wt. % of total paint.
(d) Measured on Cary UV Spectrophotometer; average value of two films.
(e) Stormer Viscometer, Krebs units (KU).

The data in Table II illustrate the results obtained by using a control dispersant (Tamol 731) and a starch ester dispersant (starch octenyl succinate of D.S. 1.5 derived from cereal solids) in a typical acrylic latex print. The $S_6$ value, which measures the hiding efficiency per gram of $TiO_2$ pigment, is seen to be satisfactory for all the paints and not greatly influenced by level of dispersant or neutralizer, provided that sufficient amounts are present.

The data in Table III summarizes the data obtained for various batches of succinate derivative. The $S_6$ value from the paints prepared by using these various batches range from 0.29 to 0.31 indicated good reproducibility and effectiveness among the various samples. The data shows that by replacing a conventional dispersant in a standard interior semi-gloss latex paint with the starch half-esters of this invention the hiding power efficiency of the $TiO_2$ increased up to about 7% in some cases.

TABLE III

Various Starch Ester Dispersants in Acrylic Latex Paint

| No. | Dispersant (a) | Starch Source | Gloss 60° | Gloss 20° | Contrast Ratio | $S_6$(b) ($m^2$/g $TiO_2$) | Visc. (KU) | Freeze-Thaw Cycles (c) |
|---|---|---|---|---|---|---|---|---|
| 1 | Tamol(d) 731 (Control) | — | 46.8 | 6.6 | 97.5 | 0.29 | 87 | — |
| 2 | n-octenyl succinate (1.5) | Cereal Solids | 38.8 | 4.5 | 96.9 | 0.29 | — | Pass 5 |
| 3 | n-octenyl succinate (1.5) | Cereal Solids | 46.6 | 11.2 | 96.3 | 0.30 | 87 | Pass 5 |
| 4 | n-octenyl succinate (1.5) | Cereal Solids | 39.6 | 4.2 | 97.3 | 0.31 | 85 | Pass 5 |

(a) All used at same level, 0.5 wt. % of solids.
(b) Measured on Cary UV Spectrophotometer.
(c) 24 hour freeze, then thaw at R. T. equals one cycle.
(d) Tamol 731 is a product of Rohm & Haas Co.

As indicated, the hydrolyzed starches are reacted with the acylating agent at ratios of from about 0.25 to 3.0 mole of the anhydrides for each anhydroglucose repeat unit of the hydrolyzed starch. The acylating agent includes the anhydrides of at least one polycarboxylic acids, e.g. one or more cyclic anhydride having up to 30 carbon atoms including the saturated or unsaturated aliphatic, cycloaliphatic, heterocyclic, e.g. isatoic anhydride and/or aromatic mono- and dianhydrides. More specifically, the anhydrides of the polycarboxylic acid must have at least one

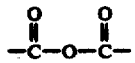

group and may be characterized by the formulae:

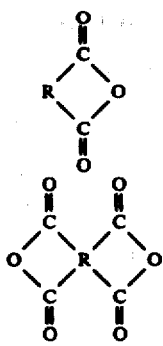

I.

II.

wherein R is an organic radical or substituted organic radical, saturated or unsaturated, selected from the class consisting of alkyl, aryl, alkaryl, aralkyl, cycloalkyl and heterocyclic radicals having up to 30 carbon atoms and preferably up to 20 carbon atoms such as the lower aliphatic polycarboxylic acid anhydrides having at least 4 carbon atoms. These organic radicals may have one or more substituents selected from the class consisting of nitro, carboalkoxy, e.g. carbomethoxy, lower alkoxy, e.g. methoxy, phenoxy and various other substituents which do not interfer with the acylation or subsequent neutralization reaction.

More specifically, the anhydrides of the polycarboxylic acids include the aliphatic, aromatic and cycloaliphatic anhydrides and specifically the ethylenically unsaturated polycarboxylic acid anhydrides such as maleic anhydride, fumaric anhydride, citraconic anhydride, itaconic anhydride, etc. Other anhydrides include the anhydrides of dicarboxylic acids such as succinic anhydride, the substituted succinic anhydrides such as octenyl succinic anhydride, nonenyl succinic anhydride, dodecyl succinic anhydride, etc. adipic anhydride, suberic anhydride, glutaric anhydride and the various aromatic carboxylic acid anhydrides such as phthalic anhydride, tetrahydrophthalic anhydride, naphthenic anhydride, etc. Also included are the cycloaliphatic anhydrides such as 3-cyclohexene-1,2-dicarboxylic acid anhydride and particularly the cyclic carboxylic acid anhydrides wherein the anhydride group forms part of the ring, i.e. where the two carboxyl groups are adjacent to one another in the molecule or sufficiently close to enable an internal rearrangement of the two carboxyl groups to form the anhydride group. Still other anhydrides of polycarboxylic acids include mellitic anhydride, trimellitic anhydrides and combinations thereof.

The dianhydride of tetracarboxylic acids include pyromellitic dianhydride; benzophenone tetracarboxylic dianhydride; diphenyl tetracarboxylic dianhydride; 2,2-bis (3,4-dicarboxyphenyl) propane dianhydride; bis(3,4-dicarboxyphenyl) ether dianhydride; bis(3,4-dicarboxyphenyl sulfone dianhydride; bis(2,3-dicarboxyphenyl) methane dianhydride; naphthalene tetracarboxylic dianhydride; benzene-1,2,3,4-tetracarboxylic dianhydride, etc.

The carboxylic acid anhydrides may be obtained by dehydrating the corresponding acid by heating to temperatures above 70° C preferably in the presence of the dehydrating agent, e.g. acetic anhydride. Generally, the cyclic anhydrides are obtained from polycarboxylic acids having acid radicals separated by no more than three carbon atoms and preferably on adjacent carbon atoms such as succinic anhydride, whereas the linear anhydrides are obtained from polycarboxylic acids having acid radicals separated by four or more carbon atoms.

The reaction of the acylating agent with the starch takes place in an organic medium substantially free of water and preferably containing at least one organic liquid capable of functioning as a solvent for the reactants or the resulting products. The preferred solvents include amines such as the aliphatic, aromatic or cyclic amines having up to 20 carbon atoms and various substituted aliphatic, aromatic or cyclic amines and particularly the tertiary amines. The preferred amines are the pyridines and quinolines such as benzyl pyridine, butyl pyridine, phenyl pyridine, propyl pyridine, methoxy pyridine, the trialkyl quinolines, e.g. trimethyl quinoline, phenyl quinoline, benzyl quinoline, methoxy quinoline, etc. In addition to pyridine, the homologs of pyridine may be used and include ethyl pyridine or picolines, e.g. dimethyl pyridine, ethyl pyridine, trimethyl pyridine, diethyl dimethyl pyridine, etc. In addition to the amines, other organic liquids or solvents include the formamides such as dimethyl formamide, diethyl formamide, the acetamides such as diethyl acetamide, dimethoxy acetamide, the sulfoxides such as dimethyl sulfoxide, etc. Other organic solvents or liquids include, for example, the dioxanes, the nitriles such as benzonitrile and various aromatic or cycloaliphatic solvents such as benzene, xylene, toluene, cyclohexane, the ketones such as methylethyl ketone, acetone, the acetates such as methyl acetate, the glycol ethers such as diethoxy ethane, the aliphatic solvents such as hexane, octane, pentane and various combinations of these organic liquids and solvents in any proportion.

Of the various sources of starch, a specific example which is particularly preferred is a hydrolyzed starch commercially available as cereal solids which comprises approximately 20% hydrolyzed starch chains containing less than seven anhydroglucose repeat units and about 80% hydrolyzed starch chains with seven or more anhydroglucose repeat units. The average molecular weight of the hydrolyzed starch is such that solutions of pourable viscosity can be prepared in water or some organic solvent at a solids content of 50% or more. In comparison to the higher molecular weight low substituted starch esters, e.g. high molecular weight starch esters having a degree of substitution less than 0.1, the highly substituted half-esters of this invention provide many advantages particularly with regard to solubility. Depending upon the wide variation in the degree of substitution and the various acylating groups, the starch esters can be prepared with controlled properties such that they may be designed for use in a particular blend of solvents ranging from water to different organic liquids and combinations of water with organic solvents. Moreover, the highly substituted low molecular weight esters have different properties by virtue of the type of ester groups and the degree of substitution including differences such as reactivity, melting point, crystallinity, solubilities, etc.

In addition to the use of the half-esters of starch as dispersants, other known dispersants may be utilized in combination therewith and include the polyethers, pyrophosphates, sulfolignins, gum arabic, silicates, sulfonates and various known dispersants which are compatible with the starch esters. Concentrated solutions of up to 20% by weight of the starch half-esters may be used as the dispersing agent for the pigment in latex coatings. These dispersants have proved beneficial in most latex formulas containing one or more pigments. The use of these half-esters to improve the degree of dispersion, e.g. $TiO_2$ permits formulation of coatings e.g. latex paints with a lower concentration of pigment than normally required due to the increased dispersion efficiency.

While this invention has been described by a number of specific embodiments, it is obvious that there are other variations and modifications which can be made without departing from the spirit and scope of the invention as set forth in the appended claims.

What is claimed is:

1. An aqueous coating composition which comprises an aqueous dispersion of about 25 to 95 parts by volume of a polymeric resin binder, 5 to 75 parts by volume of pigment and dispersing amounts of a dispersant consisting of half-esters of starch having pendant carboxylic acid groups and an average degree of substitution ranging from 0.25 to 3.0 wherein at least 10 mole percent of said pendant carboxylic acid groups are neutralized; said half-esters of starch derived from
   a. low molecular weight hydrolyzed starch having a plurality of anhydroglucose units and an average molecular weight ranging up to about 100,000 or a derivative of said hydrolyzed starch having a degree of substitution below about 0.1 and
   b. at least about 0.25 mole of at least one anhydride of a polycarboxylic acid for each anhydroglucose unit of the hydrolyzed starch or of said hydrolyzed starch derivative.

2. The coating composition of claim 1 further characterized in that the dispersant is present in an amount ranging from about 0.05 to 25% by weight of the pigment.

3. The coating composition of claim 2 further characterized in that the polymeric resin binder is present in an amount ranging from about 50 to 80 parts by volume and the pigment is present in an amount ranging from about 20 to 50 parts by volume.

4. The coating composition of claim 1 further characterized in that substantially all of the pendant carboxylic acid groups are neutralized.

5. The coating composition of claim 4 further characterized in that the pendant carboxylic acid groups are neutralized with at least one metal compound.

6. The coating composition of claim 4 further characterized in that the pendant carboxylic acid groups are neutralized with an ammonia compound.

7. The coating composition of claim 4 further characterized in that the pendant carboxylic acid groups are neutralized with at least one amine.

8. The coating composition of claim 1 further characterized in that at least one anhydride is a cyclic anhydride of a polycarboxylic acid having up to 30 carbon atoms per molecule.

9. The coating composition of claim 8 further characterized in that at least one of the cyclic anhydrides is a carboxylic acid anhydride having 4 to 20 carbon atoms per molecule.

10. The coating composition of claim 9 further characterized in that at least one of the cyclic anhydrides is an aromatic carboxylic acid monoanhydride.

11. The coating composition of claim 10 further characterized in that the aromatic monoanhydride is phthalic anhydride.

12. The coating composition of claim 1 further characterized in that the low molecular weight hydrolyzed starch comprises branched and linear anhydroglucose units and has a dextrose equivalent value ranging up to 40.

13. The coating composition of claim 12 further characterized in that the low molecular weight hydrolyzed starch consists essentially of linear anhydroglucose units.

14. The coating composition of claim 1 further characterized in that said half-esters of starch are derived from 0.5 to 3.0 moles of at least one cyclic anhydride of a polycarboxylic acid for each anhydroglucose unit of the hydrolyzed starch or a derivative of said hydrolyzed starch.

15. The coating composition of claim 1 further characterized in that the hydrolyzed starch has an average molecular weight ranging from about 2,000 to 80,000 and an average degree of substitution ranging from 1.0 to 2.5.

16. The coating composition of claim 5 further characterized in that the pendant carboxylic acid groups are neutralized with at least one alkali or alkaline earth metal compound.

17. The coating composition of claim 1 further characterized in that the pigment is titanium dioxide and the dispersant is present in an amount ranging from about 1.0 to 10% by weight of the pigment.

18. The coating composition of claim 1 further characterized in that up to 3.0 moles of the anhydride is present for each anhydroglucose unit.

19. A process of preparing aqueous coating compositions which comprises dispersing in an aqueous medium about 25 to 95 parts by volume of a polymeric resin binder, about 5 to 75 parts by volume of pigment and a dispersing amount of a dispersant consisting of half-esters of starch having pendant carboxylic acid groups and an average degree of substitution ranging from 0.25 to 3.0 wherein at least 10 mole percent of said pendant carboxylic acid groups are neutralized; said half-ester of starch derived from a. low molecular weight hydrolyzed starch having a plurality of anhydroglucose units and an average molecular weight ranging up to about 100,000 or a derivative of said hydrolyzed starch having a degree of substitution below about 0.1 and b. at least about 0.25 mole of at least one cyclic anhydride of a polycarboxylic acid for each anhydroglucose unit of the hydrolyzed starch or of said hydrolyzed starch derivative.

20. The process of claim 19 further characterized in that the dispersant is present in an amount ranging from about 0.05 to 25% by weight of the pigment.

21. The process of claim 20 further characterized in that the polymeric resin binder is present in an amount ranging from about 50 to 80 parts by volume and the pigment is present in an amount ranging from about 20 to 50 parts by volume.

22. The process of claim 19 further characterized in that at least about 50 mole percent of the pendant carboxylic acid groups are neutralized.

23. The process of claim 19 further characterized in that the cyclic anhydride of the polycarboxylic acid has up to 30 carbon atoms per molecule and is a monoanhydride of a dicarboxylic acid.

24. The coating composition of claim 1 further characterized in that at least about 50 mole percent of the pendant carboxylic acid groups are neutralized.

25. The process of claim 19 further characterized in that at least about 50 mole percent of the pendant carboxylic acid groups are neutralized.

* * * * *